Figure 1:
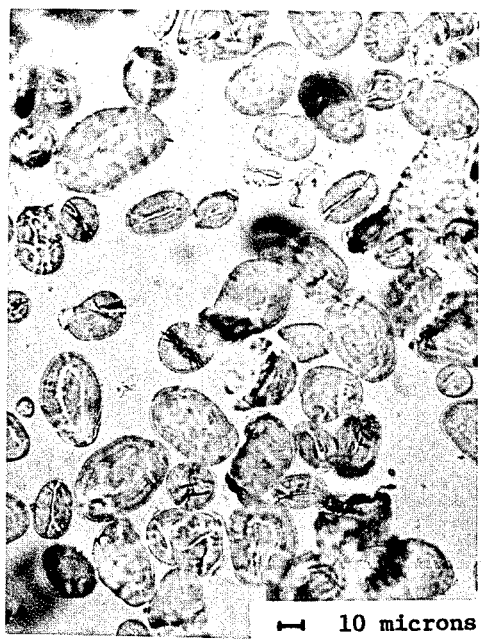

United States Patent [19]
Johnson

[11] 3,996,060
[45] Dec. 7, 1976

[54] STILT MATERIAL FOR PRESSURE SENSITIVE MICROENCAPSULATED COATINGS

[75] Inventor: Donald L. Johnson, Decatur, Ill.

[73] Assignee: A. E. Staley Manufacturing Company, Decatur, Ill.

[22] Filed: June 10, 1974

[21] Appl. No.: 477,951

[52] U.S. Cl. .................................. 127/29; 106/22; 106/210; 106/308 C; 127/32; 127/33; 127/70; 127/71; 252/316; 536/106; 282/27.5; 428/306; 428/307; 428/323; 428/327

[51] Int. Cl.$^2$ .................. B01J 13/00; C13L 1/08; D21H 3/28

[58] Field of Search .............. 127/29, 32; 428/306, 428/307, 323, 327; 260/233.3 R; 106/22, 210, 308 C; 252/316

[56] References Cited
UNITED STATES PATENTS

| | | | |
|---|---|---|---|
| 3,630,774 | 12/1971 | Knight | 127/32 |
| 3,825,467 | 7/1974 | Phillips | 428/213 |
| 3,900,671 | 8/1975 | Evans | 428/323 |
| 3,901,725 | 8/1975 | Bond | 127/32 |

OTHER PUBLICATIONS

J. A. Radley, "Starch and Its Derivatives," vol. 2, 3rd ed., 328–329, 330–331, John Wiley and Sons, New York, 1954.
"Starch: Chem. & Tech.," R. L. Whistler, ed. vol. 1, 75, 81, Academic Press, New York, 1965.
Chemical Abstracts, (I), 73: 111064a (1970).
Chemical Abstracts, (II), 80: 9123b (1974).

*Primary Examiner*—Morris O. Wolk
*Assistant Examiner*—Sidney Marantz
*Attorney, Agent, or Firm*—Howard J. Barnett; Charles J. Meyerson

[57] ABSTRACT

Large diameter starch granules derived from yellow field pea, *Pisum sativum* (var) and faba bean, *Vicia faba* L. (Leguminosae) are used to replace scarce arrowroot starch granules as a protective stilt material in microencapsulated coatings, including carbonless copy paper. The "stilt" material is used to prevent premature rupture of the microcapsules and early release of the microencapsulated materials. It has been discovered that the natural granule size, and other granule properties of the yellow field pea and faba bean starches are ideally suited to replace arrowroot starch granules as a protective material. In certain coating processes in which the temperature at the coated surface exceeds the normal pasting temperature of these starch granules, the pasting temperature of the granules can be raised by a crosslinking reaction under temperature and pH conditions to preserve the granular structure of the starch particles. A polyfunctional crosslinking agent, such as epichlorohydrin, phosphorus oxychloride, acrolein, or urea-formaldehyde can be used. Under highly alkaline conditions, using phosphorus oxychloride in a stepwise reaction procedure, it is possible to increase the pasting temperature of the starch granules by more than 25° F.

These large diameter starch particles may also be used for other purposes, such as for anti-offset powders in lithography, either with or without crosslinking or other derivatization to further improve chemical and physical properties. These starches are also useful as absorbable dusting powders. The large granule starches derived from most varieties of peas and beans can be used in the same manner.

15 Claims, 2 Drawing Figures

STILT MATERIAL FOR PRESSURE SENSITIVE MICROENCAPSULATED COATINGS

BACKGROUND OF THE INVENTION AND PRIOR ART

Carbonless copy paper is disclosed in expired U.S. Pat. No. 2,711,375 issued to Robert W. Sandberg. This patent describes pressure-rupturable hydrophilic colloid material enclosing discrete liquid inclusions of an oily marking substance. The protective material used in this early coating was interlaced fibers of cellulose. Paper coating starch binder is disclosed as an optional ingredient. However, the cellulose fibers were considered as the "anti-smudge" means in this patent (Col. 2, lines 1–3 and lines 53–56).

U.S. Pat. No. 3,574,133 issued Apr. 6, 1971 to Bayless et al. discloses microencapsulated coatings, and makes reference to many related applications. The reference mentions that the microcapsule size ordinarily ranges from about 2–1,000 microns. This patent is primarily directed to the manufacture of the minute capsules, however, and does not add anything to the solution of the smudging problem. The capsule size and function would indicate that there was a problem in handling paper substrates coated with these capsules, too.

Another related patent application was filed by Robert Bayless and Donald Emrick on the same date as the above reference. U.S. Pat. No. 3,565,818 attempts to solve the premature rupture problem by chemically treating the capsule walls with certain transition metal salts to harden them and increase their rigidity.

Netherlands Patent Application No. 7,005,045 opened for public inspection on Oct. 12, 1970, describes the smudging problem with carbonless duplicating paper coatings in much more detail, and discloses the use of a "stilt" material which is distributed uniformly in the coating to protect the capsules from premature rupture while the coated paper is being handled. The particulate "stilt material" is uniformly distributed through the coating, and it is desirable that the stilt particles be a little larger than the microcapsules to give the best protection. The known stilt materials described in this Dutch patent application are: fine glass beads, short cellulose fibers, and starch grains. The starch grains are considered effective and inexpensive stilt materials, but only starch grains of the correct size are considered useful to protect the microcapsules. As a rule of thumb, this Dutch application suggests the starch particles should be 1.2 times the average size of the microcapsules. The Dutch reference lists the following starch granules as possible "stilt" materials:

| Type of Starch | Average Particle Size in Microns | FS | TI |
| --- | --- | --- | --- |
| arrowroot | 25–50 | 93 | 50 |
| potato | 15–100 | 88 | 48 |
| sago | 20–60 | 84 | 49 |
| wheat | 2–35 | 78 | 50 |
| tapioca | 5–35 | 78 | 54 |
| maize | 5–25 | 73 | 51 |
| rice | 3–8 | 64 | 52 |

The above tabular summary includes values determined experimentally for the friction staining (FS) by coated papers containing the above stilt materials interspersed with ink containing microcapsules in the coatings. The tests are performed in a manner to simulate handling pressure applied to the coated paper samples, a value of 85 or more is considered desirable for the friction staining test, but it must be balanced by the requirement that a reasonable level of pressure should cause the capsules to rupture and form a copy image. The test devised to measure this value is referred to as the typewriter intensity (TI) test, and it is also described in the subject Dutch Patent application No. 7,005,045. A TI value of 55 or less is considered good. It can be seen from the above tabular comparison, only arrowroot and potato starches exhibited the desired friction stain (FS) value in equilibrium with the desired typewriter intensity (TI) value. Sago starch was probably close enough to be considered, but as a practical matter, all three of the above starches are too costly or too scarce to be considered useful as a "stilt" material in microcapsle coatings. (See also Can. Pat. No. 879,038). Potato starch granules are too large to be used.

U.S. Pat. No. 3,901,725 issued Aug. 26, 1975 having a common assignee herewith discloses means for obtaining a satisfactory means for physicaly separating a large granule starch stilt material from a starch having a large granule portion. The unwanted, interfering small granules are separated from the large granule portion by a means therein disclosed which has proven effective, but it adds processing cost to the stilt material.

SUMMARY OF THE INVENTION

Several new starches not disclosed in the subject Dutch patent have been discovered by me to be useful stilt materials having the required properties of particle size, TI and FS values. These new stilt materials are starches derived from certain species of legumes now being cultivated in the Great Plains provinces of Canada, where the cool climate is particularly suited for the growing of faba bean (*Vicia faba L.*) and yellow field pea (*Pisum sativum var*). Both of these legumes produce starches having a particle size within the desired range for use as a stilt material. My discovery was the result of an intensive search for a replacement for the very scarce arrowroot starch particles which, as illustrated above, had the most desirable particle size range of those starches contemplated by the applicants in Dutch Patent application 7,005,045 filed Apr. 8, 1970 in the Netherlands (priority claimed from U.S. application Ser. No. 814,336 filed Apr. 8, 1969). The particle size of the starches derived from these legumes falls in the highly desirable range of from 20–75 microns. It is further expected that these starch particles will have an ideal balance of TI (typewriter intensity) value of 55 or less when tested according to the test procedure set forth in Dutch Application No. 7,005,045 and an FS (friction stain) value of 85 or more. It is also contemplated that the pasting temperatures of these large granule starches can be increased as necessary to meet the higher temperatures used in at least one of the coating processes. The pasting temperatures may be increased by at least 20° F. by means of a highly alkaline, two step $POCl_3$ crosslinking process which retains the granular discrete particle structure of the starch. Other crosslinking agents which may be used for increasing the pasting temperature of these starches include epichlorohydrin, urea formaldehyde, mixed anhydrides (from adipic acid and acetic anhydride), and other polyfunctional crosslinkers including polyphosphate salts. The highly alkaline POCl₃ crosslinking process is presently preferred because it has a rapid reaction, and gives a substantial increase in pasting temperature. When yellow field pea starch was POCl₃ crosslinked according to the highly alkaline method, the pasting temperature was increased 20° F. in one test (Kofler hot stage pasting temperature). The faba bean starch, crosslinked by the alkaline POCl₃ reaction, had an increase in pasting temperature of about 20° F. It is believed that this substantial increase in temperature stability obtained with both of these starches makes them ideally suited for coating processes in which the drying temperature in the coating reaches as high as 158° F., with complete retention of the protective function of the "stilt" starch particles.

The types of starches which are believed useful as stilt materials and for other applications, such as anti-offset lithograph powders, include:

| Type of Plant Source | Average Starch Granule Size (Microns) | Largest Granule Size (Microns) |
|---|---|---|
| varieties of pea including the following: | | |
| yellow field pea, Pisum sativum varieties including Trapper var. 1973 and Century var. 1972 | 20–40 | 60 |
| shell pea, Pisum sativum convar. sativum, | 20–40 | 60 |
| Chickling pea, Lathyrus sativus L. (Leguminosae) | 15–30 | 45 |
| wrinkled pea, Pisum sativum var. (requires size classification) | 5–25 (bimodal) | at 25 |
| varieties of bean including the following: | | |
| faba bean, Vicia faba L. (Leguminosae) | 25–50 | 50 |
| common bean, Phaseolus vulgaris L. | 20–40 | 60 |
| French bean, Phaseolus (Leguminosae) | 20–40 | 60 |
| kidney bean, Phaseolus vulgaris, var. | 20–40 | 60 |
| runner bean, Phaseolus coccineus L. | 20–40 | 60 |
| lima bean, Phaseolus (Leguminosae) lunatus L. (Leguminosae) | 8–50 | 75 |
| adzuki bean, Phaseolus angularis [varieties including (Willd) W. F. Wright] | 30–65 | 90 |
| jack bean, Canavalia ensiformis (L.) DC (Leguminosae) | 20–40 | at 55 |
| cultivated vetch, Vicia sativa L. u.a. Arten (Leguminosae) | 20–35 | 55 |
| moon bean, Phaseolus lunatus var. | 20–50 | 75 |
| lentil, Lens esculenta (or L. culinaris) | 20–40 | at 55 |

NOTE: at = estimate

The above average granule sizes are taken, in part from the literature, and in part from actual measurements. It must be appreciated that particular samples and other varieties of legumes may have some different average granule sizes, with less or more large granules, and the actual size of the large granules observed in a particular sample can differ from sample to sample.

The above group of starches have not been used as stilt materials for carbonless paper and other microencapsulated coatings, to my knowledge, nor has this group of starches been used in anti-offset lithograph powders..

DRAWINGS

Figure 2:
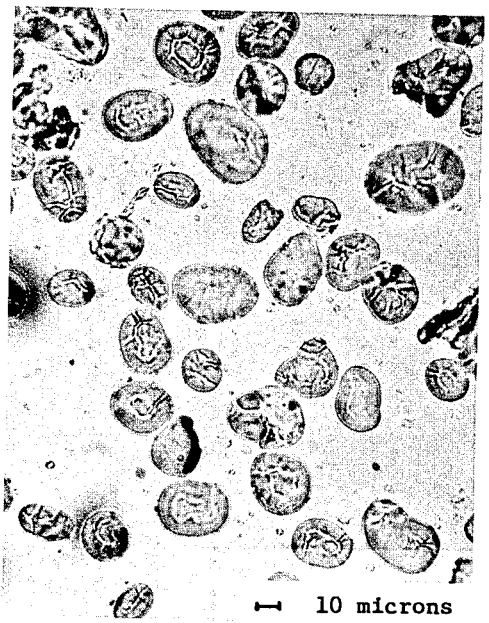

FIG. 1 of the drawings is a photomicrograph to the scale indicated (10 microns = ⅛ inch) showing starch granules of a variety of yellow field pea, *Pisum sativum L.* (Leguminosae) useful in the practice of this invention;

FIG. 2 of the drawings is a photomicrograph (10 microns = ⅛ inch) of starch granules of a variety of faba bean, *Vicia faba L.* (Leguminosae) also useful for the practice of this invention.

The above starch granules of both starch types have a average size range of from 20 to 40 microns, and some of the larger granules are about 55–60 microns in diameter. The granules are of a regular, generally spherical shape and are in the correct size range to be desirable antismudge "stilt" materials, particularly when incorporated as part of the microcapsule coating. These starch granules are also useful as lithographic anti-offset powders to prevent ink transfer from a freshly printed sheet to the back of an adjacent sheet.

EXAMPLE

Samples of starch derived from yellow field pea, *Pisum sativum* var. Trapper 1973 and Century 1972 were tested for Kofler hot stage pasting temperature, and D.S.C. pasting temperature, following the procedure described in U.S. Pat. No. 3,876,629 issued Apr. 8, 1975. Similar tests were run for starches derived from faba bean, *Vicia faba L.* (Leguminosae). All of the starch samples were obtained from starch manufacturers in Saskatchewan, Canada where these legumes are grown in increasing quantities because the cool, dry climate is particularly suited for these crops.

The test results are set forth below in tabular form:

| | Type of Starch | DSC Pasting Temperature ° C. | | | Kofler Hot Stage ° C. |
|---|---|---|---|---|---|
| | | Start | Peak | End | |
| A. | yellow field pea | 62 | 67 | 74 | 60 |
| B. | faba bean | 62 | 67 | 73 | 60 |

When the above starches were POCl₃ crosslinked using the highly alkaline process described in the above mentioned copending application, the Kofler hot stage pasting temperatures increased to 71° C. for crosslinked yellow field pea starch and 70° C. for crosslinked faba bean starch. This represents an increase in pasting temperature by means of the POCl₃ crosslinking of better than 20° F. These crosslinked products can be used in coating equipment which dries the coating at surface coating temperatures up to about 158° F. The alkali fluidity values for those crosslinked starches, again following the test procedure set forth in U.S. Pat. No. 3,876,629 issued Apr. 8, 1975, and using 15 g. dry substance starch product, 25 ml. distilled water, 80 ml. 2N NaOH, were as follows:

|   |   | Alkali fluidity |
|---|---|---|
| A. | yellow field pea | 80 |
| B. | faba bean | 55 |

It does appear that the starches derived from faba beam will require some color improvement, as by bleaching, depending on the particular color requirements in use.

The Coulter counts performed on the subject starches showed the following:

|   | Type of Starch | % Larger Than $10\mu$ | % Larger Than $20\mu$ | % Larger Than $30\mu$ |
|---|---|---|---|---|
| A. | yellow field pea | 96 | 60 | 10 |
| B. | faba bean | 100 | 55 | 5 |

In this time of critical world shortages for special materials, this discovery alleviates a shortage of carbonless copy paper stilt material by utilizing a relatively abundant new group of farm crops. These crops are grown in the part of the world which formerly was primarily dedicated to vast wheat acreage. Because the climate is dry and cool, it is ideally suited for growing yellow field pea and faba bean. In the past, these legumes were used primarily for cattle forage. The discovery that these starches can be utilized as a stilt material for pressure sensitive microencapsulated coatings represents a major breakthrough in more important industrial uses. It is expected that this development will encourage further exploitation of these unique and interesting legumes.

What is claimed is:

1. A protective material disposed between adjacent surfaces to prevent transfer of a chromogenic substance therebetween, said protective material comprising large diameter starch granules derived from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules having an average size ranging from about 20–75 microns, and having a friction staining value of at least 85 and a typewriter intensity value of 55 or less, said starch granules having been further modified, either physically or chemically, or both to improve physical properties including decrease in odor, improvement in color, and removal of non-starch materials from the large diameter starch granules.

2. The protective material of claim 1, in which the large granule starch is derived from yellow field pea, shell pea, Chickling pea, and wrinkled pea.

3. The protective material of claim 1, in which the large granule starch is derived from faba bean, varieties of common bean French bean, kidney bean, runner bean, lima bean, adzuki bean, jack bean, cultivated vetch, moon bean, and lentil.

4. The protective material of claim 1 in which the granules are derived from a plant source which is lentil.

5. In an anti-offset powder for preventing transfer between freshly printed lithographic sheets, the protective material of claim 1.

6. The protective material of claim 1, in which the starch granules are modified by means of polyfunctional crosslinking agent.

7. In a carbonless copy paper having a microencapsulated chromogenic substance coating on one surface thereof, the protective material of claim 1 uniformly dispersed in said coating.

8. The protective material of claim 1, in which the starch granules are derived from a plant source selected from the group consisting of varieties of pea including the following: yellow field pea, shell pea, Chickling pea, and wrinkled pea.

9. The protective material of claim 8, in which the plant source from which the starch is derived is selected from the group consisting of yellow field pea, and faba bean.

10. The protective material of claim 9 in which the starch granules are interspersed in a coating of microcapsules between adjacent surfaces to prevent rupture of the microcapsules until said coating is subjected to a impact force equivalent to a typewriter intensity value no more than 55.

11. The protective material of claim 10, in which the starch granules are derived from faba bean which has been bleached.

12. The protective material of claim 10, in which the starch granules are derived from yellow field pea.

13. In the method of making a carbonless copy paper including a microencapsulated chromegenic substance coated on one surface thereof, the step of incorporating in said coating a protective material comprising large diameter starch granules from legume sources selected from the group consisting of yellow field pea, shell pea, Chickling pea, wrinkled pea, faba bean, varieties of common bean, French bean, kidney bean, runner bean, lima bean, adzuki bean, jack bean, cultivated vetch, moon bean and lentil, said starch granules having an average size ranging from about 20–75 microns, and having a friction staining value of at least 85 and a typewriter intensity value of 55 or less, said starch granules having been further physically or chemically, or both, modified to improve the properties required for use as a protective material including decrease in odor, improvement in color, removal of color, increase in pasting temperature.

14. The method of claim 13, in which the starch granules are derived from yellow field pea.

15. The method of claim 13, in which the starch granules are derived from faba bean.

* * * * *